United States Patent [19]

Gattys

[11] 4,425,314

[45] Jan. 10, 1984

[54] METHOD FOR THE MANUFACTURE OF METAL OXIDE AND HYDROCHLORIC ACID FROM METAL CHLORIDE

[76] Inventor: Franz J. Gattys, Frankfurter Strasse 168-176, D-6078 Neu Isenburg, Fed. Rep. of Germany

[21] Appl. No.: 300,652

[22] Filed: Sep. 9, 1981

[51] Int. Cl.$^3$ .................. C01B 21/20; C01B 7/01; C01F 5/10
[52] U.S. Cl. ............................. 423/437; 423/481; 423/639
[58] Field of Search ............ 423/481, 497, 639, 592, 423/427; 570/216

[56] References Cited

U.S. PATENT DOCUMENTS

| | | | |
|---|---|---|---|
| 2,413,292 | 12/1946 | Christensen | 423/481 |
| 3,752,883 | 8/1973 | Moore, Jr. | 423/481 |
| 3,852,430 | 12/1974 | Lienau et al. | 423/481 |

FOREIGN PATENT DOCUMENTS 2820776 11/1979 Fed. Rep. of Germany.

Primary Examiner—Earl C. Thomas
Attorney, Agent, or Firm—Schwartz, Jeffery, Schwaab, Mack, Blumenthal & Koch

[57] ABSTRACT

Magnesium oxide and a gaseous mixture containing hydrogen chloride and carbon dioxide are prepared by selectively dehydrating magnesium chloride hexahydrate to form the dihydrate and subjecting the dihydrate to a hydropyrolytic treatment with oxygen and coke to form the magnesium oxide and gaseous mixture.

7 Claims, 2 Drawing Figures

STEAM JET HEAT PUMP FOR THE PARTIAL PYROLYSIS OF MgCl HEXAHYDRATE TO MAGNESIUM CHLORIDE-DIHYDRATE

METHOD FOR THE MANUFACTURE OF METAL OXIDE AND HYDROCHLORIC ACID FROM METAL CHLORIDE

From DE-P No. 2 820 776, a process for the preparation of magnesium oxide and a mixture of gases containing hydrochloric acid and carbon dioxide for the synthesis of vinyl chloride is known wherein magnesium chloride is exposed to a hydropyrolytic treatment by means of hot combustion gases obtained through the reducing combustion of a fuel with a low hydrogen content. The known process has been found to be highly suitable for the preparation of magnesium oxides of a high purity, sufficient for the production of refractory materials. It was discovered, however, that with the known process the maintenance of a uniform reaction temperature in hydropyrolysis cannot be assured with an adequate degree of safety, so that the occurrence of interference with operations cannot be safely excluded and that further in the hydropyrolysis an undesirably high proportion of hydrogen chloride in the form of aqueous hydrochloric acid is obtained which is unsuitable for the synthesis of vinyl chloride and must, therefore, be considered waste.

The object of the invention is the provision of a process whereby a synthesis gas containing hydrogen chloride and carbon dioxide may be obtained in an economical manner, i.e. with the lowest possible consumption of primary raw materials and primary energy and a low proportion of unusable waste materials. The invention consists of effecting the hydropyrolysis of the metal chloride by means of the direct cvombustion with oxygen or air of coke introduced in the reaction furnace and intimately mixed with the metal chloride.

In the process according to the invention heat is obtaind by the direct combustion of the fuel and in indirect contact with the reaction substance to be pyrolyzed so that the necessary high temperatures may be obtained with a low consumption of fuel and maintained uniformly during the entire reaction period.

Advantageously, the synthesis gas is prepared with a proportion of approximately 20 to 50% by weight hydrogen chloride and at least the same proportion of carbon dioxide, thereby making possible a conduct of the process adapted to the conditions of the reaction approximately so that the addition of coke is commensurate with the heat required by the pyrolysis of the metal chloride and that, initially, a synthesis gas with a high proportion of hydrogen chloride and a low proportion of carbon dioxide whereupon to reduce the proportion of gaseous hydrogen chloride in the gas to the concentration of 20–50% by volume, carbon dioxide is added from outside sources, for example, purified smoke gases obtained elsewhere.

Advantageously, a dilute solution of magnesium chloride is used as the initial material. It is dried at first to a solid magnesium chloride hexahydrate ($MgCl_2 \times 6H_2O$) and subsequently selectively dehydrated by means of a partial pyrolysis at approximately 250° C. to magnesium chloride dihydrate ($MgCl_2 \times 1.5-2.5\ H_2O$), whereupon the magnesium chloride dihydrate is exposed after the addition of coke with oxygen or air at a temperature of 600° to 800° C. to a hydropyrolytic treatment, and the synthesis gas formed in the hydropyrolysis by the conversion of the magnesium chloride to magnesium oxide, is subsequently dried. Such dilute magnesium chloride solutions with a concentration of, for example, 20% by weight are obtained in large volumes for example in the production of potash fertilizers in the form of alkaline waste liquors. They are representing, therefore, a substantial portion of water pollution and may be used gainfully in the process according to the invention, wherein they are conveniently at first mixed with magnesium oxide or magnesium hydroxide and then spray concentrated to a concentration of 40% by weight in a flow of smoke gas and subsequently chemically purified by means of crystallization. Spray concentration is effected in direct contact with the smoke gas at a temperature of approximately 120° to 180° C. and thus makes it feasible to use waste gases of the energy producing industry and the utilization of the heat carried by them, wherein simultaneously, as a further advantage of the process according to the invention, because of the use of the magnesium hydroxide formed from the magnesium oxide added, the smoke gases are purified of the sulfur and nitrogen oxides contained therein, which after this purification are no longer contaminating the environment, upon their release in the atmosphere following the synthesis of vinyl chloride. The process according to the invention further provides the significant advantage that as the result of the strong dehydration of the magnesium chloride to the dihydrate and the use of coke as a fuel free of hydrogen for the hydropyrolysis, practically no water is introduced in the reaction so that in the drying stage following the hydropyrolysis only negligibly small amounts of liquid hydrochloric acid are obtained in a highly concentrated form.

Portions of the magnesium hydroxide formed in the process are utilized conveniently as the point of initiation for the formation of magnesium hydroxide. Similarly, the highly concentrated hydrochloric acid obtained in small amounts during the drying of the synthesis gas may be converted to magnesium chloride with the aid of the magnesium oxide formed in the process and recycled into the process.

The process of the invention is illustrated in the drawing as an example.

IN THE DRAWING

In the first stage after the addition of MgO, the spray concentration of the alkaline magnesium chloride solution is effected to a concentration of 40% by weight while simultaneously purifying the smoke gases of the sulfur and nitrogen oxide impurities contained therein which are combined with the magnesium hydroxide formed by the addition of magnesium oxide. Accordingly, the amount of MgO to the alkaline magnesium chloride solution for the purpose of forming $Mg(OH)_2$ is thus commensurate with the sulfur and nitrogen oxide impurpities in the smoke gas. With the volume given the spray concentration requires an amount of heat of 20 million kcal/h which may be obtaind from the waste heat of the waste gases of energy producing industries arriving at a temperatue of 120° to 180° C.

In the subsequent purification stage the concentrated alkaline magnesium chloride solutions by means of a stepwise crystallization is effected in a known manner, wherein the separation of the sulfites, nitrites and nitrates resulting from the purification of the smoke gases, also takes place.

In a further spray drying stage, the alkaline magnesium chloride solution concentrated to a 40% solution and purified in this manner is spray dried with the air of a flow of steam again produced by means of waste heat to a solid magnesium chloride hexahydrate and subsequently with the aid of a carrier gas selectively dehydrated at a temperature of approximately 250° C. to magnesium chloride dihydrate ($MgCl_2 \times 1.5$–$2.5\ H_2O$). Here again, it is possible to utilize waste heat in an amount of 3.5 million kcal/h from the smoke gases of power stations arriving at a temperature of 120° to 180° C., the smoke gases initially being used to produce hot water at a temperatue of 120° C., whereupon an organic, temperature resistant liquid is evaporated with the use of waste heat recovered in this manner by the principle of the heat pump under high pressure and with the aid of this vapor a carrier gas as the gas for the partial pyrolysis is heated to 250° C. with the simultaneous recovery of electrical secondary energy.

Figure 1:
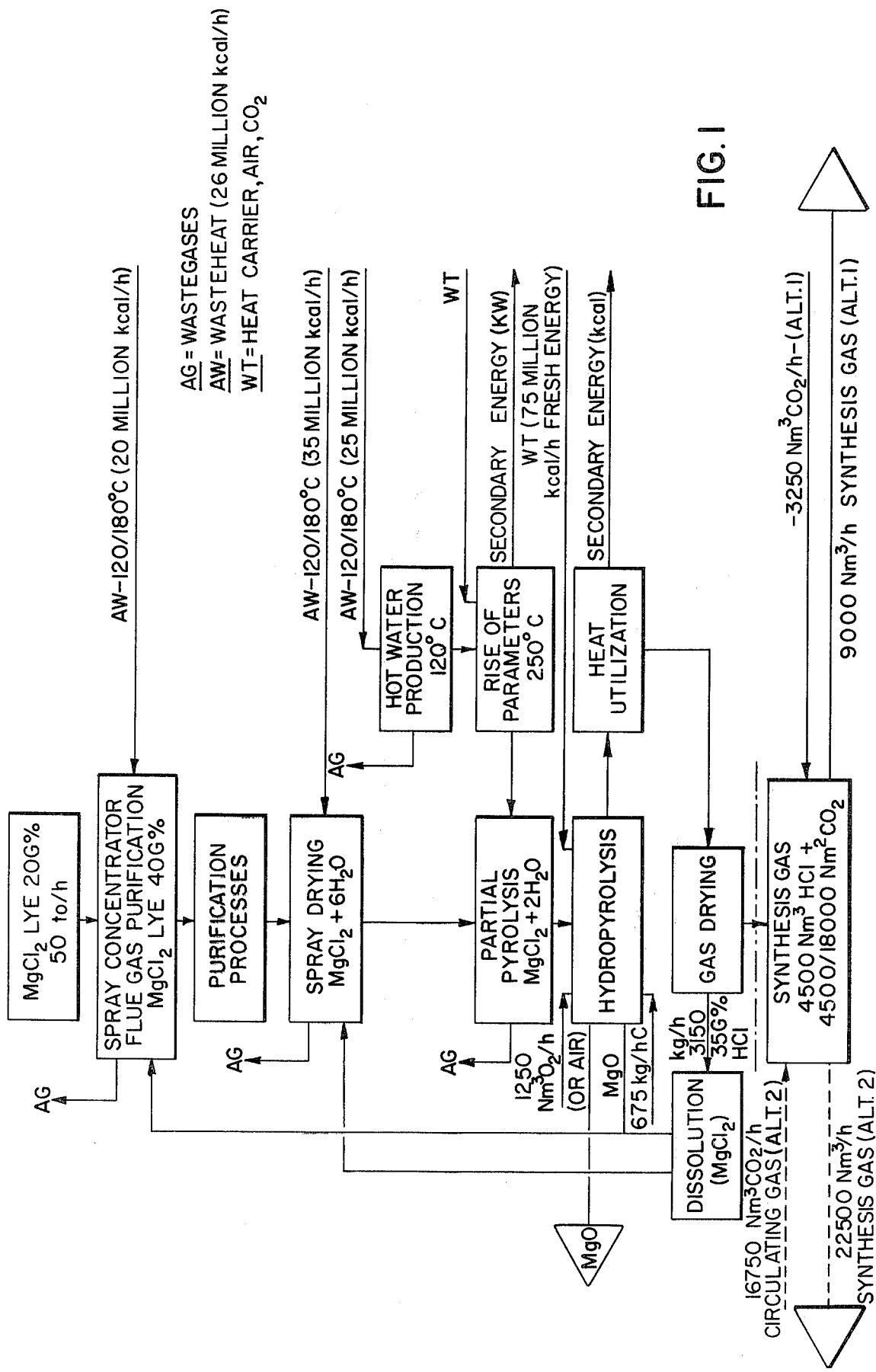
FIG. 1 shows a flow diagram of an installation with a capacity of 50 t/h of a solution containing 20% by weight $MgCl_2$.
Figure 2:
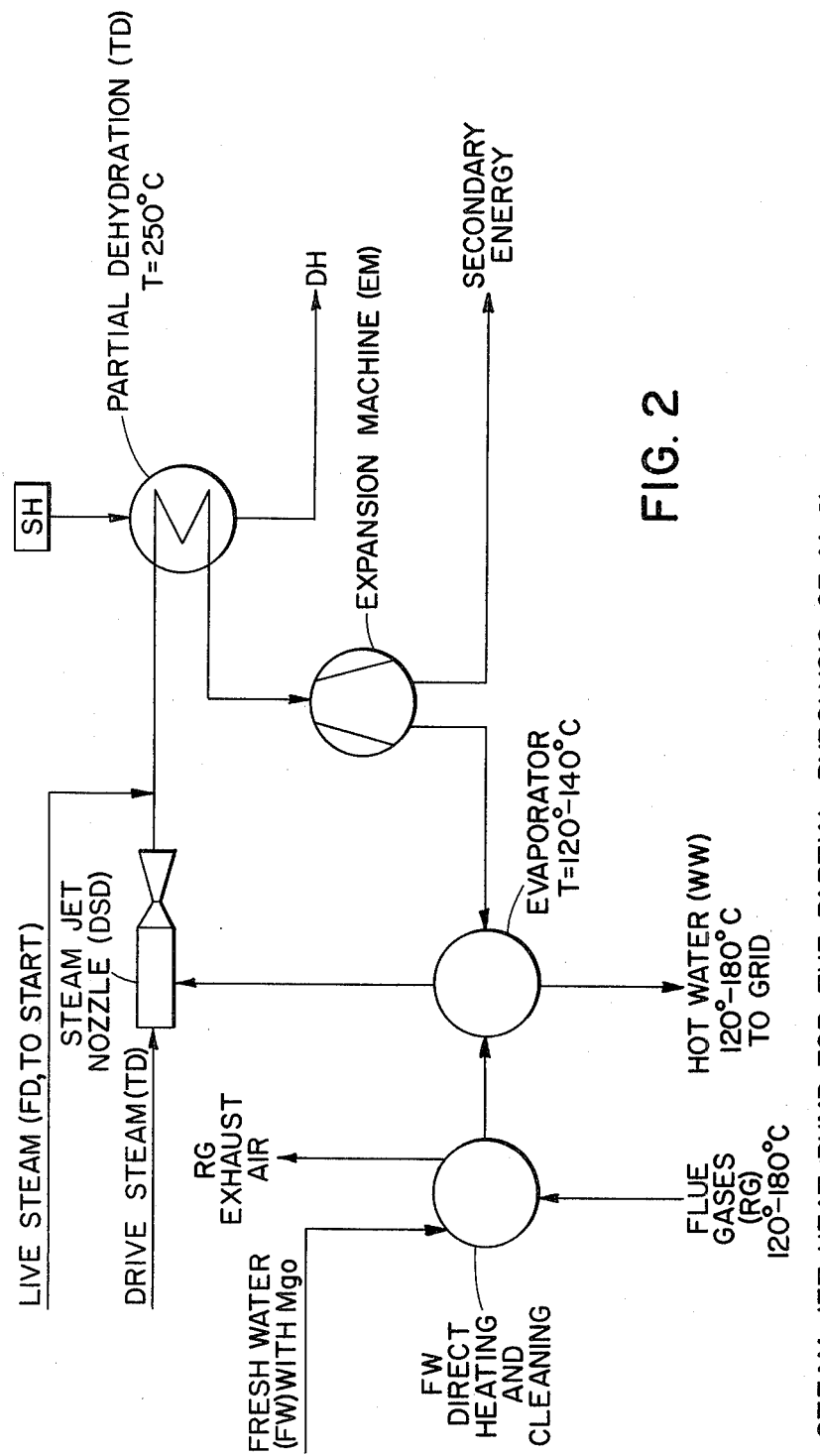
FIG. 2 is a schematic representation of an installation to raise the process (parameter increase) in the dehydrating stage.

For this purpose, FIG. 2, a jet heat pump is inserted preceding the stage of partial hydrolysis wherein with the aid of a driving medium exhaust steam is raised to a higher level of pressure and temperature. It is seen in FIG. 2 that the MgO containing water coming from the purification stage at approximately 120–140° C. is passed into an evaporator, preceded by a steam jet which in turn is thermally actuated with superheated steam at 25 atm as the driving steam. By means of this driving steam, the saturated vapor evaporated from the heated water is suctioned off from the evaporator and raised to a working temperature of approximately 250° C. The steam obtained in this manner is conducted into the partial pyrolysis stage, FIG. 1, wherein it is used for the dehydration of $MgCl_2 \times 6H_2O$ to $MgCl_2 \times 2H_2O$. In the expansion machine, FIG. 2, following the partial pyrolysis stage, the condensae is expanded with the recovery of electrical secondary energy and returned to the evaporator. Heat may also be recovered from the excess water, for example, by means of a compression heat pump.

The magnesium chloride dehydrated by means of partial pyrolysis to the dihydrate is then hydropyrolyzed in the next stage with the addition of coke and the introduction of oxygen or air, whereby magnesium oxide and synthesis gas are obtained. A portion of the magnesium oxide obtained is applied to its intended use of the production of refractory bricks while a second portion is returned as the initial material in the spray concentration stage and a third part is used in the conversion of the hyrochloric acid obtained as waste material in the subsequent gas drying stage to magnesium chloride which in turn is introduced as a recycled substance into the spray drying stage.

Between the hydropyrolysis stage and the drying stage, a heat recovery stage is inserted wherein the combustion heat carried out by the gas is recovered and transmitted for use as secondary energy. The resultant synthesis gas is obtained in an amount of approximately 5750 $Nm^3$/h with a proportion of approximately 4500 $Nm^3$ hydrogen chloride. This synthesis gas is diluted by the addition of carbon dioxie from a third source in an amount of 3250 $Nm^3$/h to 9000 $Nm^3$/h synthesis gas with 50% by volume each of hydrogen chloride and carbon dioxide as the alternative upper limits. To form a synthesis gas with a proportion of 20% by volume hydrogen chloride, an addition of approximately 16,750 $Nm^3$ $CO_2$/h from third sources, preferably from recycling is required, whereby a total gas volume of approximately 22,500 $Nm^3$/h synthesis gas with a proportion of 20% by volume 4,500 $Nm^3$/h hydrogen chloride is obtained.

I claim:

1. Process for the preparation of magnesium oxide and a mixture of gases containing hydrogen chloride and carbon dioxide from magnesium chloride hexahydrate, comprising selectively dehydrating the magnesium chloride hexahydrate to produce the dihydrate, exposing the dihydrate after the addition of coke to a hydropyrolytic treatment with oxygen at a temperature of 600° C. to 800° C. and converting the dihydrate to magnesium oxide and subsequently drying the synthesis gas formed in the hydropyrolysis with the conversion of the magnesium chloride to metal oxide.

2. The process of claim 1 wherein the synthesis gas is produced with a proportion of 20.0 to 50% by volume of hydrogen chloride and at least the same proportion of carbon dioxide.

3. The process of claim 2 wherein the magnesium chloride is mixed with the amount of coke required for the production of the reaction heat for hydropyrolysis and that the amount of carbon dioxide necessary for the establishment of the hydrogen chloride concentration desired in the reaction gas containing a high proportion of hydrogen chloride is added from a third source.

4. The process of claim 1 wehrein the magnesium chloride is obtained from dilute magnesium chloride solutions, said magnesium chloride solutions being dried initially to the solid magnesium hexahydrate ($MgCl_2 \times 6H_2O$) and subsequently selctively dehydrated by means of partial pyrolysis at approximately 250° C. to magnesium chloride dihydrate ($MgCl_2 \times 1.5$–$2.5\ H_2O$).

5. The process of claim 4 wherein the dilute magnesium chloride solution is mixed with magnesium oxide or magnesium hydroxide and spray concentrated to a concentration of approximately 40% by weight in a directly introduced flow of smoke gases and subsequently chemically purified by means of crystallization.

6. The procs sof claim 5 wherein magnesium hydroxide is obtained from magnesium oxide.

7. The process of claim 5 wherein highly concentrated hydrochloric acid is obtained in the drying of the synthesis gas and said acid is converted to magnesium chloride with the aid of the magnesium oxide formed in the process and recycled in the process.

* * * * *